United States Patent [19]

Bratten

[11] Patent Number: 5,064,536
[45] Date of Patent: Nov. 12, 1991

[54] WEDGEWIRE FILTER AND METHOD OF MANUFACTURE

[76] Inventor: Jack R. Bratten, 5970 St. James Dr., West Bloomfield, Mich. 48033

[21] Appl. No.: 375,370
[22] Filed: Jul. 3, 1989
[51] Int. Cl.$^5$ .............................................. B23D 13/04
[52] U.S. Cl. .................................. 210/402; 29/163.8; 29/557; 166/234; 209/393; 210/498
[58] Field of Search .................... 210/402, 497.01, 499, 210/498; 29/163.7, 163.8, 557, 558; 166/231–234; 209/393, 400

[56] References Cited

U.S. PATENT DOCUMENTS

| | | | |
|---|---|---|---|
| 1,040,342 | 10/1912 | Johnson | 166/233 |
| 2,288,883 | 7/1942 | Bixby | 209/393 |
| 3,037,630 | 6/1962 | Bixby | 209/393 |
| 3,221,819 | 12/1965 | Dickinson et al. | 210/497.1 |
| 3,327,865 | 6/1967 | Thompson | 210/497.01 |
| 4,283,278 | 8/1981 | Savage et al. | 210/498 |
| 4,407,720 | 10/1983 | Bratten | 210/404 |
| 4,670,143 | 6/1987 | Bratten | 210/402 |

FOREIGN PATENT DOCUMENTS

| | | | |
|---|---|---|---|
| 1182195 | 11/1964 | Fed. Rep. of Germany | 29/163.8 |
| 1188557 | 3/1966 | Fed. Rep. of Germany | 210/497.01 |
| 2706938 | 8/1978 | Fed. Rep. of Germany | 210/499 |
| 54-45868 | 4/1979 | Japan | 210/499 |
| 57-113817 | 7/1982 | Japan | 210/499 |
| 2033242 | 5/1980 | United Kingdom | 210/499 |

OTHER PUBLICATIONS

Catalog No. 148 by Edward E. Johnson, Inc., "Well Screens", Copyright 1947, 210-497.1.

Primary Examiner—Robert A. Dawson
Assistant Examiner—Joseph Drodge
Attorney, Agent, or Firm—John R. Benefiel

[57] ABSTRACT

An improved filter of the type including closely spaced wedgewire windings defining a permanent filter media by allowing liquid flow through the gaps, in which the outer face of the wedgewire strands are ground away to eliminate the radiused corners on each strand, which corners create a small convergent region intermediate adjacent strands of wedgewire tending to trap solids and clog the filter when particles sizes are present in a range tending to wedge in those regions, particularly when gelatinous substances are also present.

3 Claims, 1 Drawing Sheet

WEDGEWIRE FILTER AND METHOD OF MANUFACTURE

This invention concerns filters and more particularly permanent media filters of the type using wound "wedgewire" as the filter media. In this kind of filter, a wedge shaped drawn metal wire is spirally wrapped around a drum frame, each turn closely spaced to the adjacent turns to define a narrow gap comprising a filtering flow space. The wire is welded or otherwise secured to provide a permanent filtering element. The filtered solids accumulate on the surface of the filter, which is periodically scraped to remove accumulated solids.

In U.S. Pat. No. 4,407,720 issued on Oct. 4, 1983 to the present inventor, a rotating drum filter constructed of wedgewire is described in which there is sequential backwashing of each section of wedgewire through a series of flow collecting axial chambers shaped into the drum configuration. In that patent, the drum filter element is horizontally mounted in a tank receiving the liquid to be filtered. In U.S. Pat. No. 4,622,145 issued to the present inventor on Nov. 11, 1986, there is described a wedgewire drum filter mounted vertically in a tank to simplify plumbing connections and to enable the addition of an inside wedgewire layer to increase filtering capacity.

The wedge shape of the wire is oriented with respect to the filtering flow so that a divergent flow space is defined between adjacent windings of the wedgewire. This divergent characteristic prevents the wedging of solid particles in this space which instead tends to be cleared by fluid flow and thus prevents clogging of the filter.

Under certain conditions, particularly when gelatinous substances are present, clogging of a wedge wire filter will sometimes occur notwithstanding the self cleaning effect of the divergent flow passages.

It is the object of the present invention to reduce the tendency for clogging of wedgewire filters.

SUMMARY OF THE INVENTION

The present inventor has discovered that the radiused upper corners of the wedgewire creates relatively small convergent regions upstream of the main divergent flow spaces, the presence causing wedging of solid particles of a certain range of sizes, and, particularly when gelatinous material is present in the liquid, clogging of the filter will occur if particle sizes in the aforementioned range are present in any significant concentration. By grinding of the upper surface of the wedge wire to a depth equal to the radiused corners, these spaces are eliminated, and only divergent spaces exist between the wedgewire windings. This avoids the tendency for filter clogging as particles are cleared by the flow of liquid through the filter media.

DETAILED DESCRIPTION

In the following detailed description, certain specific terminology will be employed for the sake of clarity and a particular embodimetn described in accordance with the requirements of 35 USC 112, but it is to be understood that the same is not intended to be limiting and should not be so construed inasmuch as the invention is capable of taking many forms and variations within the scope of the appended claims.

Figure 1:
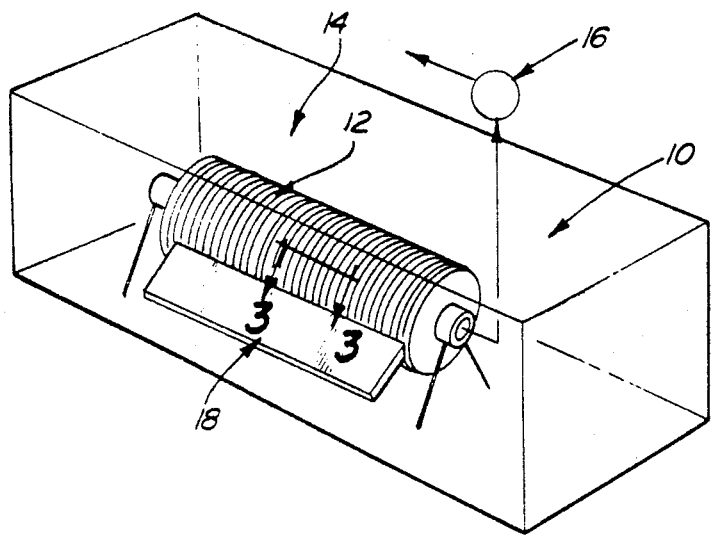
FIG. 1 is a perspective view of a drum filter of the type with which the present invention is concerned, incorporating a wound wedgewire filter media.

FIG. 1 illustrates a drum filter 10 incorporating a filter media layer 12 with which the present invention is concerned. The drum filter 10 is mounted in a tank 14, either horizontally or vertically, and the liquid to be filtered is directed into the tank 14 by a circulation system 16. The liquid is drawn through the media layer 12 by the circulation system 16 and filtered liquid collected for return through passages in the interior of the drum filter 10.

The drum filter 10 may be mounted and driven for rotation to enable scraping of the surface with a scraper blade 18 in the tank 14 to incorporate the backwashing system shown in U.S. Pat. Nos. 4,407,702 and 4,622,145.

The various details of such drum filter and associated components is not here described, since these are well known to those skilled in the art and do not form a part of the present invention.

Figure 2:
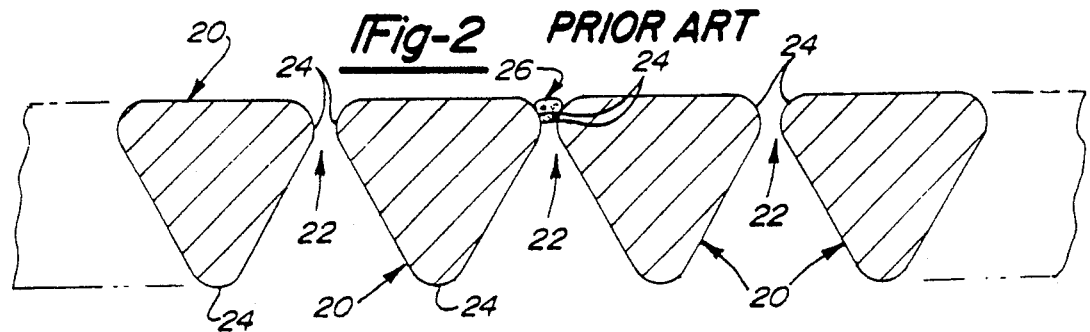
FIG. 2 is a greatly enlarged transverse sectional view taken across several wedge wire windings of conventional configuration, with a fragmentary view of a wiper blade.

FIG. 2 illustrates several strands 20 of the wedgewire which are spaced apart a predetermined distance which may vary for a given filtering application. The generally triangular sectional shape of the wedgewire windings 20 are oriented with one side directly facing the direction of flow, with the other two sides extending away to form gaps 22 generally diverging in the direction of fluid flow. The gaps 22 receive the flow of liquid to be filtered, and the particles to be removed are trapped above the wedgewire strands 20, and periodically scraped away by scraper blade 18.

The wedgewire is manufactured by a drawing process and necessarily has a radiused surface 24 at each corner, which radius typically is on the order of 0.010 inches. The present inventor has determined that the presence of such rounded corners on the one side of the wedgewire strands at adjacent strands. creates a region of convergency in the gaps 22 at the outer side of the filter media. If particles in just the right range of sizes are present in the liquid, these particles 26 will wedge themselves in this region. The action of the scraper blade 78 will tend to force these particles 26 into that region rather than scraping these off the surface. Furthermore, if gelatinous substances are present, the particles 26 will increasingly tend to bind together to clog the filter in gaps 22, resisting clearing by backwashing.

Figure 3:
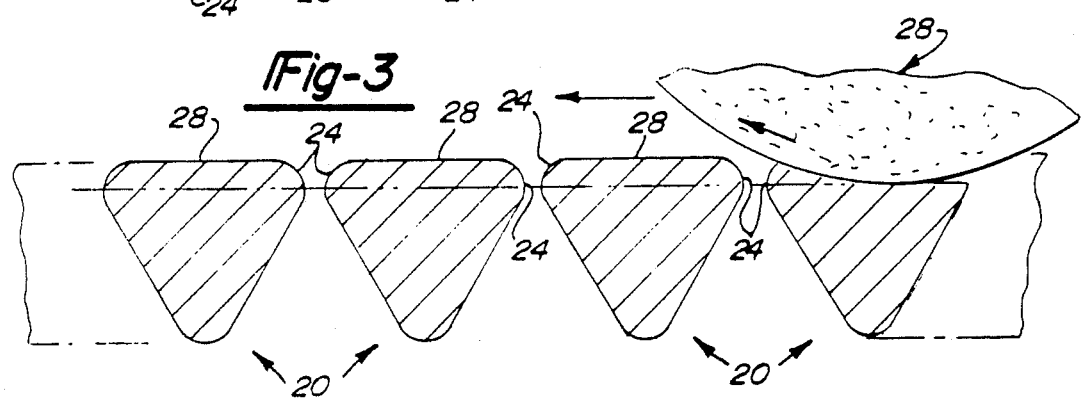
FIG. 3 is a view of the section shown in FIG. 2 depicting modification of the wedgewire windings according to the concept of the present invention, as by a grinding operation indicated.
Figure 4:
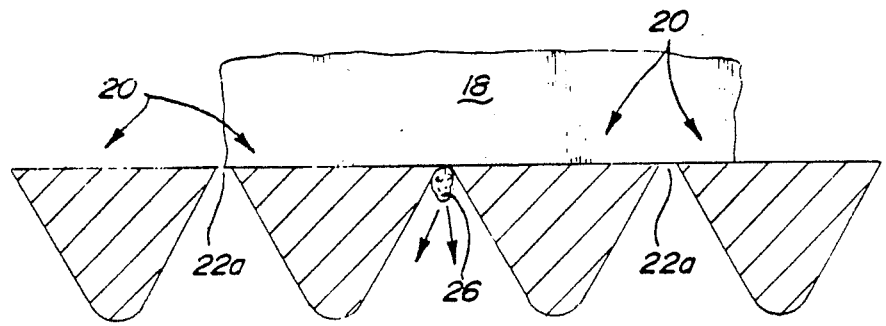
FIG. 4 depicts several windings of wedgewire modified according to the concept of the present invention.

According to the concept of the present invention, the filter performance is improved in this regard by removing, as by a grinding wheel 28 shown in FIG. 3, a layer of material from the outer face 28 of each of the windings of strands 20 to a depth corresponding to the region of convergency, eliminating the rounded surfaces 24. This leaves only the diverging gaps 22a between successive windings of strands 20 so that the wedging tendency is eliminated. Any particles which pass into the gaps 22a will be carried completely through by the liquid flow. The larger particles will collect on the surface where they can be removed by scraping and backwashing.

It has been determined that by this elimination of the wedging region in the gaps 22, that the problem of clogging in certain applications is greatly alleviated.

I claim:

1. A method of manufacturing an improved filter of the type in which a series of side by side adjacent wedgewire strands are fixed slightly spaced apart to define filtering space for liquid flow directed through said spaces, the wedgewire having three sides converging with each other to be generally triangularly shaped in section, and oriented with one side of said triangular shape directly facing the direction of flow of liquid to be filtered and the other two sides extending away from the direction of said liquid flow to create generally diverging gaps between successive wedgewire strands to form a permanent filter media, and in which said wedgewire strands are formed by drawings, so as to form radiused shoulders at the converging sides of said triangularly shape in section wedgewire strands, said radiused shoulders at either end of the one side of adjacent wedgewire strands forming small convergent regions in said gaps, said method of manufacturing characterized by the step of removing a single even layer of material from each strand of said wedgewire windings across said one side of said wedgewire strands facing said liquid flow, to a depth sufficient to substantially just remove said radiused shoulders at either end of said one side to thereby substantially eliminate said small convergent regions in said gaps.

2. The method according to claim 1 further including the step of winding said wedgewire strands to form a drum shape with the one side of each wedgewire strand facing outwardly with respect to said drum shape so that liquid flows into the outer surface thereby formed, said removal step removing a layer of material from the outer surface of said drum shape to the depth of said radiused shoulders.

3. A filter constructed according to the method of claim 1.

* * * * *